(12) United States Patent
Shin

(10) Patent No.: US 12,530,997 B2
(45) Date of Patent: Jan. 20, 2026

(54) CURVED DISPLAY APPARATUS

(71) Applicant: LG Display Co., Ltd., Seoul (KR)

(72) Inventor: Donghyeok Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 495 days.

(21) Appl. No.: 17/988,183

(22) Filed: Nov. 16, 2022

(65) Prior Publication Data

US 2023/0206797 A1    Jun. 29, 2023

(30) Foreign Application Priority Data

Dec. 24, 2021    (KR) .......................... 10-2021-0187058

(51) Int. Cl.
*G09G 3/00*  (2006.01)
*H05K 5/02*  (2006.01)
*H05K 5/03*  (2006.01)

(52) U.S. Cl.
CPC ............. *G09G 3/03* (2020.08); *H05K 5/0217* (2013.01); *H05K 5/03* (2013.01)

(58) Field of Classification Search
CPC .......... G09G 3/03; H05K 5/0217; H05K 5/03
See application file for complete search history.

(56) References Cited

U.S. PATENT DOCUMENTS

| | | | | |
|---|---|---|---|---|
| 4,883,450 A * | 11/1989 | Benoit | ................... | B31B 70/00 |
| | | | | 493/926 |
| 8,111,351 B2 * | 2/2012 | Cho | .................. | G02F 1/133608 |
| | | | | 349/64 |
| 8,922,113 B2 * | 12/2014 | Forrest | ................... | H05B 33/10 |
| | | | | 445/24 |
| 9,123,290 B1 * | 9/2015 | Cho | ...................... | G06F 1/1652 |
| 9,173,287 B1 * | 10/2015 | Kim | ...................... | G06F 1/1622 |
| 9,173,288 B1 * | 10/2015 | Kim | ...................... | H05K 1/0281 |
| 9,179,559 B1 * | 11/2015 | Kim | .................... | H04M 1/0268 |
| 9,204,565 B1 * | 12/2015 | Lee | .......................... | E05D 7/00 |
| 9,348,369 B2 * | 5/2016 | Kee | ....................... | G06F 1/1641 |

(Continued)

FOREIGN PATENT DOCUMENTS

| | | |
|---|---|---|
| CN | 107170367 A | 9/2017 |
| CN | 109767694 A | 5/2019 |

(Continued)

OTHER PUBLICATIONS

Wang et al., "The Influence of the Bending Mode on the Mechanical Behavior of AMOLEDs," in IEEE Access, vol. 9, pp. 152442-152448, 2021, doi: 10.1109/ACCESS.2021.3127185. (Year: 2021).*

(Continued)

*Primary Examiner* — Peter Radkowski
(74) *Attorney, Agent, or Firm* — Fenwick & West LLP

(57) ABSTRACT

A curved display apparatus is disclosed, in which light leakage does not occur or is reduced even though a display panel is bent. The curved display apparatus comprises a display portion having a first curvature and a second curvature that is larger than the first curvature, a driving portion configured to drive the display portion, and a connection portion connecting the driving portion with display portion, wherein the connection portion includes a pattern area between the display portion having the second curvature and the driving portion, the pattern area having a pattern.

14 Claims, 10 Drawing Sheets

(56) References Cited

U.S. PATENT DOCUMENTS

| | | | |
|---|---|---|---|
| 9,402,021 B2* | 7/2016 | Kawanishi | H04N 5/08 |
| 9,450,038 B2* | 9/2016 | Kwon | H01L 21/31111 |
| 9,603,271 B2* | 3/2017 | Lee | G09F 9/301 |
| 9,910,458 B2* | 3/2018 | Watanabe | G06F 1/16 |
| 10,031,281 B2* | 7/2018 | Soh | G02B 6/0045 |
| 10,153,331 B1* | 12/2018 | Jun | H10K 59/8792 |
| 10,317,035 B2* | 6/2019 | Shido | F21S 43/13 |
| 10,320,025 B2* | 6/2019 | Hiroki | H01M 50/557 |
| 10,383,239 B2* | 8/2019 | Lee | G06F 1/1652 |
| 10,448,527 B2* | 10/2019 | Lin | G06F 1/1681 |
| 10,599,378 B2* | 3/2020 | Choi | G06F 1/1641 |
| 10,657,850 B2* | 5/2020 | Kim | G09F 9/301 |
| 10,670,892 B2* | 6/2020 | Nakazawa | G02F 1/133305 |
| 10,748,957 B1* | 8/2020 | McKnight | H10F 39/011 |
| 10,838,458 B1* | 11/2020 | Park | H04M 1/0214 |
| 10,910,589 B2 | 2/2021 | Jeong et al. | |
| 11,013,130 B2* | 5/2021 | Shin | G09F 9/301 |
| 11,157,100 B2* | 10/2021 | Park | G06F 1/1681 |
| 11,256,295 B2* | 2/2022 | Lee | G09F 9/301 |
| 11,296,156 B2* | 4/2022 | Kim | H10K 50/805 |
| 11,304,315 B2* | 4/2022 | Kim | H05K 5/03 |
| 11,342,519 B2* | 5/2022 | Bu | H10K 50/844 |
| 11,357,118 B2* | 6/2022 | Kang | G02F 1/13452 |
| 11,362,299 B2* | 6/2022 | Choi | H10K 77/111 |
| 11,412,614 B2* | 8/2022 | Ha | H01L 23/4985 |
| 11,755,067 B2* | 9/2023 | Park | G06F 1/1641 |
| | | | 361/679.27 |
| 12,164,329 B2* | 12/2024 | Park | G06F 1/1618 |
| 2004/0135160 A1* | 7/2004 | Cok | H10K 50/80 |
| | | | 257/88 |
| 2006/0138179 A1* | 6/2006 | Suffa | B65D 47/2031 |
| | | | 222/490 |
| 2007/0103776 A1* | 5/2007 | Cok | G03B 21/56 |
| | | | 359/451 |
| 2010/0079699 A1* | 4/2010 | Cho | G02F 1/133608 |
| | | | 349/61 |
| 2013/0200781 A1* | 8/2013 | Forrest | H10K 50/856 |
| | | | 313/504 |
| 2014/0002975 A1* | 1/2014 | Lee | B32B 37/0046 |
| | | | 156/196 |
| 2014/0355195 A1* | 12/2014 | Kee | H04M 1/0268 |
| | | | 361/679.27 |
| 2015/0070567 A1* | 3/2015 | Kawanishi | H04N 23/673 |
| | | | 348/349 |
| 2015/0111088 A1* | 4/2015 | Hiroki | H01M 50/105 |
| | | | 429/233 |
| 2015/0173171 A1* | 6/2015 | Kim | G06F 1/1637 |
| | | | 361/749 |
| 2015/0256658 A1* | 9/2015 | Shin | G06F 1/1637 |
| | | | 455/566 |
| 2015/0257289 A1* | 9/2015 | Lee | H05K 5/0226 |
| | | | 361/749 |
| 2015/0260993 A1* | 9/2015 | Bickerstaff | G06F 3/013 |
| | | | 345/8 |
| 2015/0296641 A1* | 10/2015 | Song | F16M 11/18 |
| | | | 361/679.01 |
| 2015/0378391 A1* | 12/2015 | Huitema | G06F 1/1652 |
| | | | 361/679.03 |
| 2016/0035812 A1* | 2/2016 | Kwon | H10D 86/411 |
| | | | 438/151 |
| 2016/0037625 A1* | 2/2016 | Huitema | H05K 1/0281 |
| | | | 361/749 |
| 2016/0058366 A1* | 3/2016 | Choi | A61B 5/7246 |
| | | | 600/595 |
| 2016/0066463 A1* | 3/2016 | Yang | G02F 1/133305 |
| | | | 361/679.01 |
| 2016/0079336 A1* | 3/2016 | Youn | H10K 50/805 |
| | | | 257/40 |
| 2016/0094693 A1* | 3/2016 | Song | H04M 1/0269 |
| | | | 455/575.1 |
| 2016/0172623 A1* | 6/2016 | Lee | B32B 3/04 |
| | | | 257/40 |
| 2016/0249471 A1* | 8/2016 | Li | G09F 9/30 |
| 2016/0291384 A1* | 10/2016 | Shao | G02F 1/133308 |
| 2016/0306393 A1* | 10/2016 | Huitema | G06F 1/1643 |
| 2016/0327987 A1* | 11/2016 | Huitema | G04G 17/045 |
| 2016/0336523 A1* | 11/2016 | Kwon | H10K 50/868 |
| 2016/0377869 A1* | 12/2016 | Lee | G02B 27/0172 |
| | | | 359/631 |
| 2017/0013728 A1* | 1/2017 | Lee | G02F 1/133308 |
| 2017/0062532 A1* | 3/2017 | Jeong | H10K 59/122 |
| 2017/0115701 A1* | 4/2017 | Bae | G06F 1/16 |
| 2017/0188463 A1* | 6/2017 | Kim | H05K 1/028 |
| 2017/0192460 A1* | 7/2017 | Watanabe | G02F 1/133305 |
| 2017/0256599 A1* | 9/2017 | Kim | H10K 77/111 |
| 2017/0261684 A1* | 9/2017 | Soh | G02B 6/0045 |
| 2017/0271617 A1* | 9/2017 | Choi | H10K 50/8426 |
| 2017/0307929 A1* | 10/2017 | Nakazawa | G02F 1/16753 |
| 2017/0309843 A1* | 10/2017 | Kim | B32B 3/30 |
| 2017/0329567 A1* | 11/2017 | Choi | G06F 1/1641 |
| 2018/0210505 A1* | 7/2018 | Chen | H05K 1/028 |
| 2018/0219176 A1* | 8/2018 | Kim | H10K 59/8722 |
| 2018/0242466 A1* | 8/2018 | Lee | G06F 1/1652 |
| 2018/0286938 A1* | 10/2018 | Moon | H10K 59/124 |
| 2019/0013369 A1* | 1/2019 | Bu | H10K 50/844 |
| 2019/0014674 A1* | 1/2019 | Lin | E05D 3/18 |
| 2019/0075656 A1* | 3/2019 | Kim | G02F 1/13452 |
| 2019/0129567 A1* | 5/2019 | Rhe | G06F 3/0443 |
| 2019/0189962 A1* | 6/2019 | Cho | H10K 59/8791 |
| 2019/0208627 A1* | 7/2019 | Liang | H05K 1/028 |
| 2019/0237699 A1* | 8/2019 | Hu | H10K 50/8445 |
| 2019/0251876 A1* | 8/2019 | Kim | G06F 1/1652 |
| 2019/0363266 A1* | 11/2019 | Tanaka | G06F 1/1681 |
| 2019/0377445 A1* | 12/2019 | Jeong | G06F 3/04164 |
| 2020/0004296 A1* | 1/2020 | Lee | G06F 1/1641 |
| 2020/0006397 A1* | 1/2020 | Park | H10D 86/443 |
| 2020/0008308 A1* | 1/2020 | Shin | G09F 9/301 |
| 2020/0008309 A1* | 1/2020 | Kim | H05K 5/03 |
| 2020/0075878 A1* | 3/2020 | Jiang | H10K 77/111 |
| 2020/0103990 A1* | 4/2020 | Park | G06F 1/1652 |
| 2020/0168670 A1* | 5/2020 | Kim | H10D 86/451 |
| 2020/0176720 A1* | 6/2020 | Bu | H10K 77/111 |
| 2020/0185641 A1 | 6/2020 | Jeong et al. | |
| 2020/0355216 A1* | 11/2020 | Bae | G06F 1/1652 |
| 2021/0057669 A1* | 2/2021 | Choi | H10K 59/12 |
| 2021/0083020 A1* | 3/2021 | Zhou | H10K 59/12 |
| 2021/0091340 A1* | 3/2021 | Sun | H10K 50/858 |
| 2021/0107251 A1* | 4/2021 | Chen | H04M 1/0269 |
| 2021/0107829 A1* | 4/2021 | Chen | G06F 1/1637 |
| 2021/0136934 A1* | 5/2021 | Kang | G02F 1/13452 |
| 2021/0144868 A1* | 5/2021 | Song | G06F 1/1652 |
| 2021/0166590 A1 | 6/2021 | Jung et al. | |
| 2021/0259110 A1* | 8/2021 | Ha | H05K 1/0281 |
| 2021/0336164 A1* | 10/2021 | Bu | H10K 59/873 |
| 2021/0349506 A1* | 11/2021 | Morita | G06F 1/1656 |
| 2022/0068170 A1* | 3/2022 | Han | G06F 1/1652 |
| 2022/0287195 A1* | 9/2022 | Chen | G06F 1/1652 |
| 2022/0291712 A1* | 9/2022 | Baby | G06F 1/1637 |
| 2023/0044853 A1* | 2/2023 | Park | H04M 1/0268 |
| 2023/0393618 A1* | 12/2023 | Park | H04M 1/185 |

FOREIGN PATENT DOCUMENTS

| | | | | |
|---|---|---|---|---|
| CN | 112908171 A | 6/2021 | | |
| CN | 113257116 A | 8/2021 | | |
| KR | 10-2015-0070567 A | 6/2015 | | |
| KR | 10-2020-0069527 A | 6/2020 | | |
| KR | 10-2021-0024374 A | 3/2021 | | |
| KR | 10-2021-0068737 A | 6/2021 | | |
| WO | WO-2021041882 A1 * | 3/2021 | | C03C 17/32 |

OTHER PUBLICATIONS

Korean Intellectual Property Office, Office Action, Korean Patent Application No. 10-2021-0187058, Apr. 18, 2025, 11 pages.

China National Intellectual Property Administration, Office Action, Chinese Patent Application No. 202211446413.3, Mar. 24, 2025, 13 pages.

* cited by examiner

CURVED DISPLAY APPARATUS

CROSS-REFERENCE TO RELATED APPLICATION

This application claims the benefit of the Republic of Korea Patent Application No. 10-2021-0187058 filed on Dec. 24, 2021, which is hereby incorporated by reference in its entirety.

FIELD OF TECHNOLOGY

The present disclosure relates to a curved display apparatus for displaying an image.

DESCRIPTION OF THE RELATED ART

With the advancement of the information age, the demand for a display device for displaying an image has increased in various forms. Therefore, various types of display devices such as a liquid crystal display (LCD) device, a plasma display panel (PDP) device, an organic light emitting display (OLED) device and a quantum dot light emitting display (QLED) device have been recently used.

An application range of a display apparatus have been diversified to a vehicle as well as a monitor of a computer and a television (TV), and studies for a display apparatus having a wide display area without deterioration of visibility of an image depending on a position are ongoing. Recently, studies for a curved display apparatus having a predetermined curvature to prevent visibility of an image from being deteriorated depending on a position of a user are actively ongoing.

A general curved display apparatus includes a display panel having flexibility and displaying an image, a circuit board for driving the display panel, and a connector disposed between the display panel and the circuit board to electrically connect the display panel with the circuit board.

In the general curved display apparatus, the display panel is made of a material having flexibility, whereas the circuit board is made of a material that does not have flexibility. Therefore, when the display panel is bent to have a curvature, the display panel connected to the circuit board is torn, whereby a problem occurs in that light leakage occurs.

SUMMARY

The present disclosure has been made in view of the above problems and it is an object of the present disclosure to provide a curved display apparatus in which light leakage does not occur or is reduced even though a display panel is bent.

In addition to the objects of the present disclosure as mentioned above, additional objects and features of the present disclosure will be clearly understood by those skilled in the art from the following description of the present disclosure.

In accordance with an aspect of the present disclosure, the above and other objects can be accomplished by the provision of a curved display apparatus comprising a display portion having a first curvature and a second curvature larger than the first curvature, a driving portion driving the display portion, and a connection portion connecting the driving portion with display portion, wherein the connection portion includes a pattern area provided between the display portion having the second curvature and the driving portion, having a pattern.

In accordance with another aspect of the present disclosure, the above and other objects can be accomplished by the provision of a curved display apparatus comprising a display portion having a curvature, a driving portion driving the display portion, and a connection portion connecting the driving portion with the display portion, wherein the connection portion includes a pattern area provided between the display portion having the curvature and the driving portion, having a pattern.

In accordance with still another aspect of the present disclosure, a curved display apparatus comprising: a display portion including a first area having a first curvature and a second area having a second curvature; a driving portion driving the display portion; and a connection portion connecting the driving portion with the display portion, wherein a distance between the second area and the driving portion is greater than a distance between the first area and the driving portion, wherein the connection portion includes a pattern area provided between the second area and the driving portion, having a pattern, and wherein a shape of the pattern varies depending on a curvature change amount of the pattern area.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
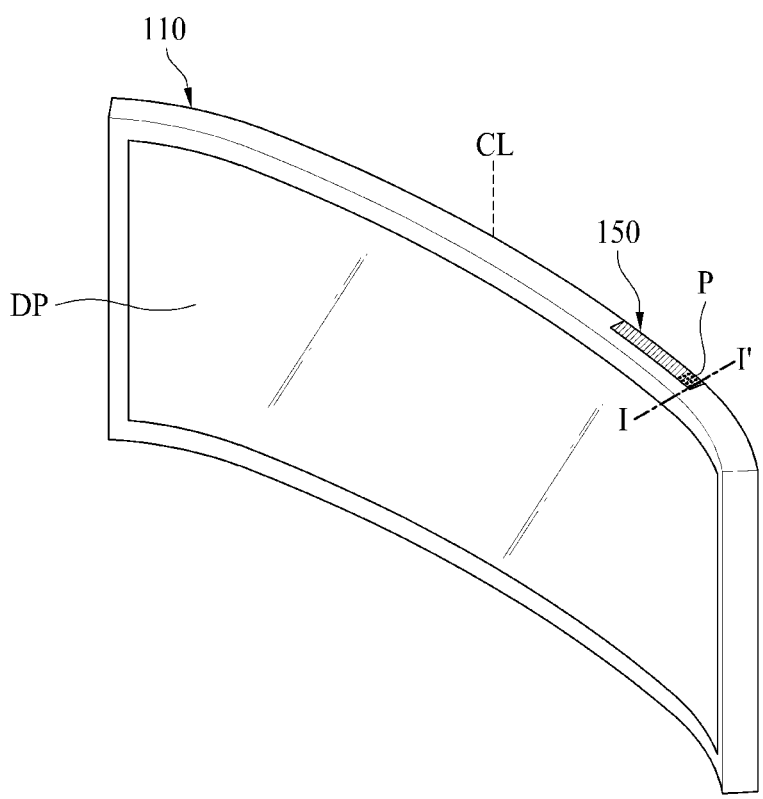
FIG. 1 is a perspective view illustrating a curved display apparatus according to one embodiment of the present disclosure.

Reference will now be made in detail to the embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary. In construing an element, the element is construed as including an error range although there is no explicit description.

In describing a position relationship, for example, when a position relation between two parts is described as 'on~', 'over~', 'under~' and 'next~', one or more other parts may be disposed between the two parts unless 'just' or 'direct' is used.

In describing a temporal relationship, for example, when the temporal order is described as "after," "subsequent," "next," and "before," a case which is not continuous may be included, unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

"X-axis direction", "Y-axis direction" and "Z-axis direction" should not be construed by a geometric relation only of a mutual vertical relation and may have broader directionality within the range that elements of the present disclosure may act functionally.

The term "at least one" should be understood as including any and all combinations of one or more of the associated listed items. For example, the meaning of "at least one of a first item, a second item and a third item" denotes the combination of all items proposed from two or more of the first item, the second item and the third item as well as the first item, the second item or the third item.

Features of various embodiments of the present disclosure may be partially or overall coupled to or combined with each other and may be variously inter-operated with each other and driven technically as those skilled in the art can sufficiently understand. The embodiments of the present disclosure may be carried out independently from each other or may be carried out together in co-dependent relationship.

Hereinafter, the preferred embodiments of the present disclosure will be described in detail with reference to the accompanying drawings.

Figure 2:
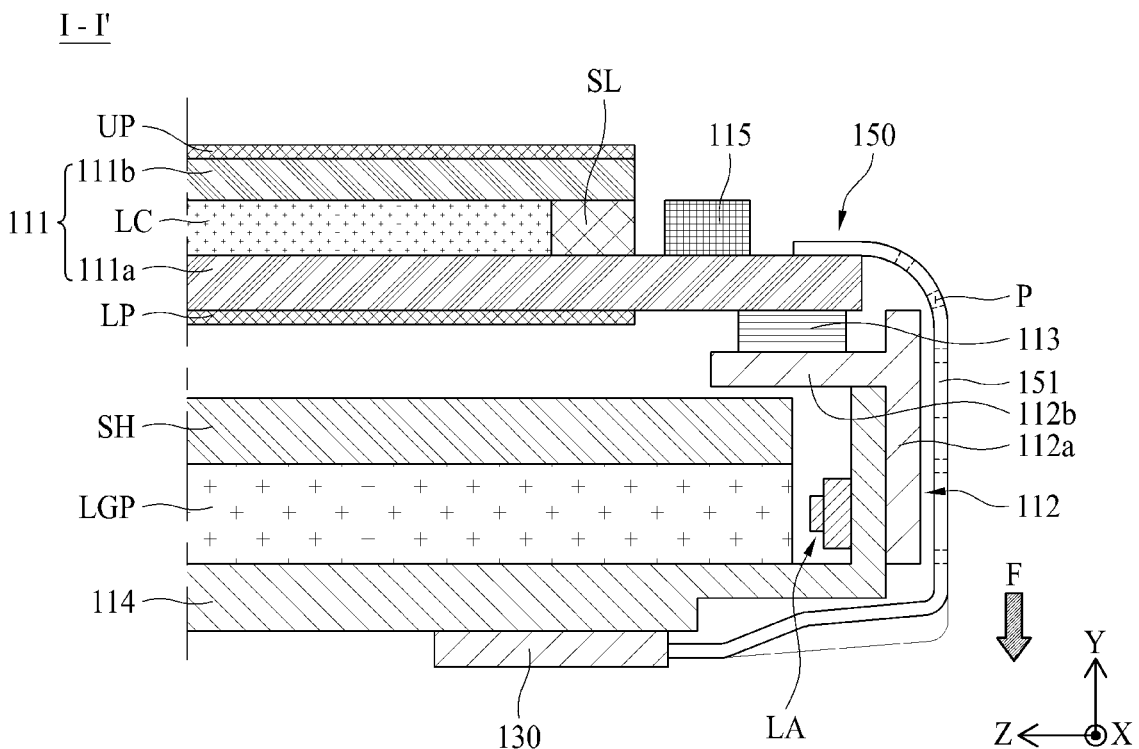
FIG. 2 is a cross-section view along line I-I' shown in FIG. 1 according to one embodiment of the present disclosure.
Figure 3:
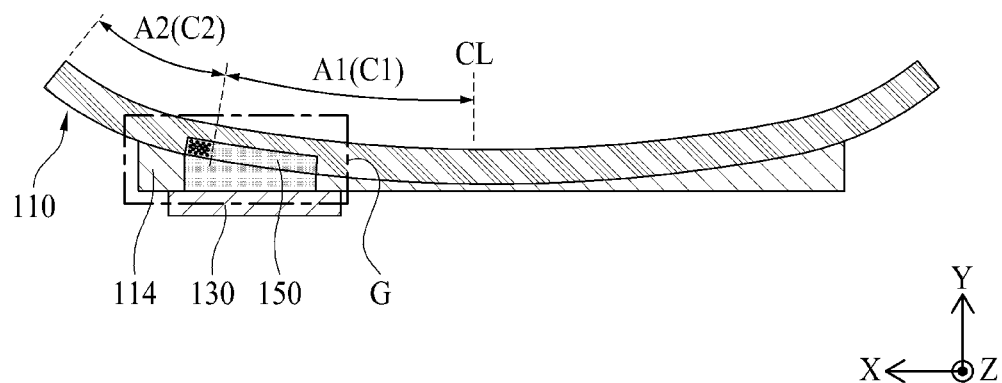
FIG. 3 is a plan view of FIG. 1 according to one embodiment of the present disclosure.
Figure 4:
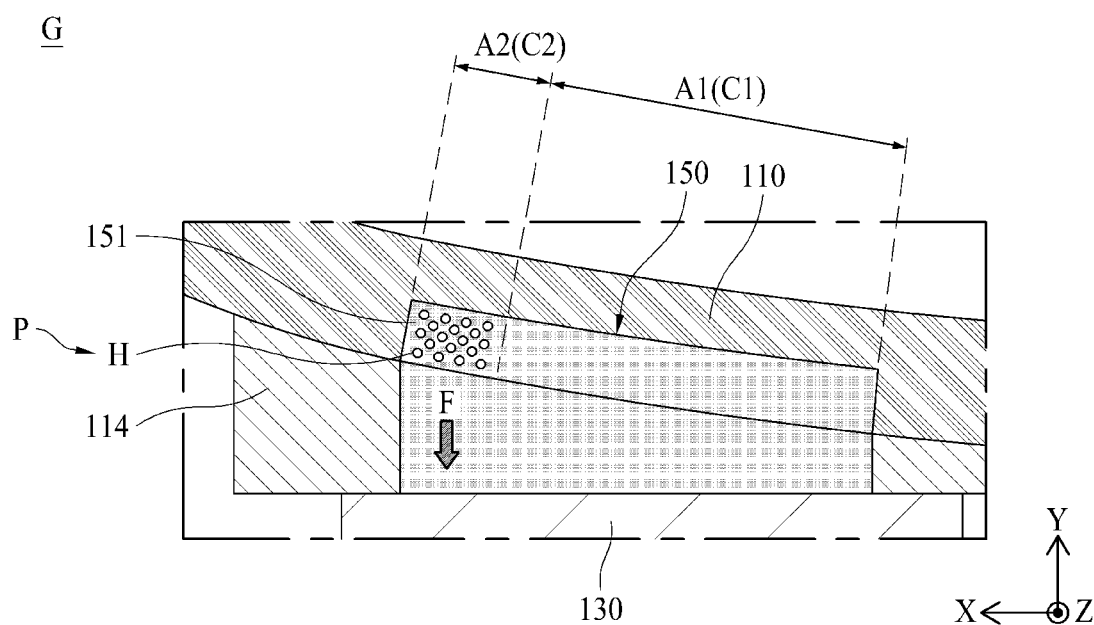
FIG. 4 is a schematic enlarged view illustrating a portion G of FIG. 3 according to one embodiment of the present disclosure.

FIG. 1 is a perspective view illustrating a curved display apparatus according to one embodiment of the present disclosure, FIG. 2 is a cross-section view along line I-I' shown in FIG. 1 according to one embodiment of the present disclosure, FIG. 3 is a plan view of FIG. 1 according to one embodiment of the present disclosure, and FIG. 4 is a schematic enlarged view illustrating a portion G of FIG. 3 according to one embodiment of the present disclosure.

Hereinafter, X-axis represents a long side direction of a display panel and may be expressed as a first direction, Y-axis represents a direction in which the display panel is bent or a thickness direction of the display panel and may be expressed as a second direction, and Z-axis represents a short side direction of the display panel and may be expressed as a third direction.

Referring to FIGS. 1 to 4, a curved display apparatus 100 according to one embodiment of the present disclosure may include a display portion 110, a driving portion 130 and a connection portion 150. The display portion 110 may be bent to have a predetermined curvature. For example, the display portion 110 may be bent to have a first curvature C1 and a second curvature C2 that is larger than the first curvature C1. In this case, the connection portion 150 may include a pattern area 151 provided between the display portion 110 having the second curvature C2 and the driving portion 130. The pattern area 151 may include various types of patterns P from which a portion of the connection portion 150 is removed. The pattern P is for reducing and/or distributing an external force (or stress) applied to the connection portion 150 (or the pattern area 151) as the display portion 110 is bent.

The reason why the external force (or stress) applied to the connection portion 150 is reduced is that the display portion 110 is provided as a flexible display portion that is flexible, i.e., bendable, whereas the driving portion 130 for driving the display portion 110 does not have flexibility, and thus the display portion 110 is damaged to cause light leakage when the display portion 110 is bent (or curved) to have a curvature.

In more detail, since a plurality of lines and a plurality of circuits, which are provided in the driving portion 130, may be damaged when the driving portion 130 is curved, the driving portion 130 may be disposed to be flat so as not to be bent. Therefore, the driving portion 130 may be coupled to a flat support such as a cover bottom or a separate support, and may be connected to the display portion 110 through the connection portion 150. In this case, when the display portion 110 is bent to have a curvature, an external force (or stress) may be applied to the connection portion 150 connecting the flat driving portion 130 with the bent display portion 110 so that the display portion 110 may be torn, whereby a problem may occur in that light leakage occurs when an image is output.

In order to solve the above-described problem, in the curved display apparatus 100 according to one embodiment of the present disclosure, the pattern area 151 having the pattern P is formed at a portion of the connection portion 150 to which the external force (or stress) is greatly applied, so that the external force (or stress) applied to the connection portion 150 is dispersed to prevent or at least reduce the display portion 110 from being torn, whereby light leakage may be avoided or reduced.

Hereinafter, the display portion 110, the driving portion 130 and the connection portion 150 of the curved display apparatus 100 according to one embodiment of the present disclosure will be described in detail with reference to FIGS. 1 to 4.

Referring to FIGS. 1 to 4, the display portion 110 may include a display panel 111, a guide panel 112, a shock buffer 113, a cover bottom 114 and a drive integrated circuit (IC) 115.

The display panel 111 may include a lower substrate 111a and an upper substrate 111b, which are bonded to each other. The lower substrate 111a according to one example may include a thin film transistor (not shown) for driving a plurality of pixels. Therefore, the lower substrate 111a may be a transistor array substrate. As another example, the lower substrate 111a may be a base substrate or a first substrate. The lower substrate 111a may be a transparent glass substrate or a transparent plastic substrate.

The upper substrate 111b may be bonded to the lower substrate 111a to face each other. For example, the upper substrate 111b may have a size that is smaller than a size of the lower substrate 111a, and may be bonded to the remaining portion except a pad portion of the lower substrate 111a to face each other. The upper substrate 111b may be a second substrate, an encapsulation substrate, or a color filter substrate. The upper substrate 111b may be bonded to a first surface of the lower substrate 111a by a substrate bonding process using an adhesive member (or transparent adhesive) SL. A portion of the drive IC 115 and/or a portion of the connection portion 150 may be coupled to the pad portion.

A liquid crystal LC may be provided between the lower substrate 111a and the upper substrate 111b. The liquid crystal LC may be surrounded by the adhesive member SL, the upper substrate 111b and the lower substrate 111a. In the display panel 111, liquid crystal (LC) cells constituting a pixel unit are arranged in the form of a matrix, and light transmittance of the liquid crystal cells is adjusted so that an image may be output through the display portion DP.

A polarizing plate may be coupled to the display panel 111. The polarizing plate is used to cross-polarize light passing through the display panel 111. The polarizing plate may include an upper polarizing plate UP disposed on an upper surface of the upper substrate 111b and a lower polarizing plate LP disposed on a lower surface of the lower substrate 111a. The upper and lower polarizing plates UP and LP may be disposed so that the polarization axes cross each other. The lower polarizing plate LP may polarize light incident on the display panel 111, and the upper polarizing plate UP may serve as an analyzer for vibrating light, which vibrates in a random direction, only in one direction. The lower polarizing plate LP may be disposed on a lower surface of the lower substrate 111a so that it may be spaced apart from the shock buffer 113, but is not limited thereto.

The lower polarizing plate LP may be disposed on the lower surface of the lower substrate 111a so that it may be adjacent to the shock buffer 113.

A backlight unit may be provided below the display panel 111. The backlight unit may include an optical sheet SH, a light guide plate LGP and a light emitting array LA. The optical sheet SH may be disposed parallel to a rear surface of the display panel 111. The optical sheet SH may include a plurality of sheets to uniformly irradiate light incident from the light guide plate LGP to the display panel 111. For example, the optical sheet SH may include a protection sheet, a prism sheet and a diffusion sheet.

The light guide plate LGP may be formed in a flat plate shape to have a light incident surface so that the light incident on the light incident surface from the light emitting array LA may move toward the display panel 111. A reflection sheet (not shown) for reflecting light, which is emitted toward a rear surface of the light guide plate LGP, toward the display panel 111 may be further provided on the rear surface of the light guide plate LGP, that is, between the light guide plate LGP and the cover bottom 114.

The light emitting array LA is configured to emit light so that the light is incident on the light incident surface of light guide plate LGP. The light emitting array LA may be disposed on a sidewall of the cover bottom 114 to face the light incident surface of the light guide plate LGP. At least one of a cold cathode fluorescent lamp, an external electrode fluorescent light source, a surface light source or an LED may be used as the light emitting array LA.

The guide panel 112 is to support the display panel 111. For example, the guide panel 112 may be supported by the cover bottom 114 (or the sidewall of the cover bottom 114) to support a bottom surface of the display panel 111. The guide panel 112 may be provided in the form of a 'T' shape that is laid down as a whole. As shown in FIG. 2, the guide panel 112 may include a vertical portion 112a attached to the sidewall of the cover bottom 114 and a horizontal portion 112b protruded from the vertical portion 112a toward the center of the display panel 111 on which the optical sheet SH is positioned. The shock buffer 113 may be in contact with the lower surface of the lower substrate 111a by being supported by the horizontal portion 112b, thereby supporting the lower substrate 111a. Since the guide panel 112 is attached to the sidewall of the cover bottom 114 protruded from the side of the display panel 111, a portion of the guide panel 112 may be partially protruded from the side of the display panel 111. The guide panel protruded from the side of the display panel 111 may be the vertical portion 112a of the guide panel 112.

The shock buffer 113 is to mitigate an external shock applied to the display panel 111. The shock buffer 113 according to one example may be made of a foam material capable of absorbing a shock. The shock buffer 113 may be disposed between the rear surface (or lower surface) of the lower substrate 111a and the horizontal portion 112b of the guide panel 112. The shock buffer 113 may be coupled to the rear surface of the lower substrate 111a at a position spaced apart from the lower polarizing plate LP. The shock buffer 113 may mitigate a shock transferred to the display panel 111 by absorbing the shock transferred through the cover bottom 114 and/or the guide panel 112. As shown in FIG. 2, a portion of the connection portion 150 coupled to the lower substrate 111a may overlap the shock buffer 113 and/or the horizontal portion 112b of the guide panel 112 in the second direction (Y-axis direction).

The cover bottom 114 is to support the guide panel 112 and the display panel 111. The cover bottom 114 serves as a back cover of the display portion 110, and may be positioned on the rear surface of the display portion 110 opposite to the display portion DP. The cover bottom 114 may include a bottom surface, which is in contact with the lower surface of the light guide plate LGP, and a sidewall extended in a vertical direction from the bottom surface. As described above, the vertical portion 112a of the guide panel 112 may be in contact with the sidewall of the cover bottom 114. As shown in FIG. 2, a portion of the horizontal portion 112b of the guide panel 112 may be in contact with the sidewall of the cover bottom 114.

The light emitting array LA, the light guide plate LGP and the optical sheet SH may be accommodated in a space formed by the bottom surface and the sidewall of the cover bottom 114, that is, inside the cover bottom 114. A transmissive area that is not covered by the horizontal portion 112b of the guide panel 112 may be provided between the optical sheet SH and the display panel 111 (or the lower polarizing plate LP). Light of the backlight unit may be incident on the display panel 111 through the transmissive area.

The driving portion 130 may be disposed on the rear surface of the cover bottom 114. The driving portion 130 may be disposed on the rear surface of the display panel 111 (or the cover bottom 114) to reduce a bezel area of the display portion 110. As the driving portion 130 is disposed on the rear surface of the display panel 111 (or the cover bottom 114), the connection portion 150 connecting the driving portion 130 with the display panel 111 may be bent from the upper surface of the lower substrate 111a toward the rear surface of the cover bottom 114 as illustrated in FIG. 2. In this case, the connection portion 150 may be disposed to surround at least a portion of the guide panel 112. In more detail, the connection portion 150 may be connected to the display panel 111 and the driving portion 130 while surrounding a portion of each of the display panel 111 and the cover bottom 114, and the protruded guide panel 112, that is, the vertical portion 112a. Therefore, at least a portion of the connection portion 150 may overlap the vertical portion 112a of the guide panel 112. Referring to FIG. 2, the connection portion 150 may overlap a right surface, an upper surface and a lower surface of the vertical portion 112a.

The drive IC 115 is configured to drive a plurality of pixels provided in the display panel 111. The drive IC 115 may drive the plurality of pixels provided in the display panel 111 based on a control signal input from the driving portion 130 through the connection portion 150. The drive IC 115 may be coupled to the display panel 111 to be adjacent to the connection portion 150. For example, as shown in FIG. 2, the drive IC 115 may be coupled to the upper surface of the lower substrate 111a between the adhesive member SL and one side of the connection portion 150.

At least two drive ICs 115 may be provided between the adhesive member SL and the connection portion 150. When one drive IC is provided, a size of the drive IC should be increased, whereas when two or more drive ICs are provided, the size of the drive IC may be reduced. When the size of the drive IC is reduced, a size of a bezel may be reduced and contraction stress generated when the drive IC is attached to the display panel 111 (or the lower substrate 111a) may be reduced, whereby the drive IC may be prevented from being damaged or broken. This will be described later with reference to FIGS. 12A and 12B.

Referring back to FIG. 2, the driving portion 130 coupled to the rear surface of the cover bottom 114 may be disposed to be flat to prevent or at least reduce the plurality of lines or circuits provided therein from being damaged. On the other hand, since the display panel 111 is bent to have a predetermined curvature in the second direction (Y-axis direction) as shown in FIG. 1, an external force (or stress) F may be applied to the connection portion 150 connecting the display panel 111 with the driving portion 130 in the second direction (Y-axis direction) as shown in FIG. 2. If there is no pattern in the connection portion, the external force (or stress) may be greatly applied to one portion of the connection portion as the display panel is bent, whereby the connection portion may be damaged or the display panel (or the lower substrate) may be bent to be torn from the upper substrate. In this case, light leakage may occur between the lower substrate and the upper substrate when an image is output.

In the curved display apparatus 100 according to one embodiment of the present disclosure, a portion (or pattern area 151) of the connection portion 150 is provided with a pattern P from which a portion of the connection portion 150 is removed, so that the external force (or stress) F applied to one place of the connection portion 150 may be dispersed to prevent the connection portion 150 from being damaged and the lower substrate 111a with respect to the upper substrate 111b may be prevented from being torn, whereby light leakage may be avoided or reduced.

In detail, referring to FIGS. 2 to 4, both sides of the display portion 110 may be bent based on a center line CL of the display panel 111. For example, the display portion 110 may include a first area A1 that is adjacent to the center line CL and a second area A2 that is adjacent to the first area A1. The first area A1 may be bent to have a first curvature C1, and the second area A2 may be bent to have a second curvature C2 that is larger than the first curvature C1. The second area A2 may be disposed closer to an edge portion of the display portion 110 (or the display panel 111) than the first area A1. Since visibility for a user is reduced toward the edge from the center of the display portion 110, the display portion 110 (or the display panel 111) may be more bent toward the edge of the display portion 110. Therefore, the second curvature C2 of the second area A2 may be larger than the first curvature C1 of the first area A1.

Even though the first area A1 and the second area A2 of the display portion 110 have the same curvature, as shown in FIG. 4, the external force (or stress) F may be greater in the second area A2 formed to be farther spaced apart from the driving portion 130 than the first area A1. This is because, as the display portion 110 is bent, a force pulled through the connection portion 150 in the second area A2 is greater than that in the first area A1. In this case, the second area A2 has the same curvature as that of the first area A1, and may be defined as an area having a distance spaced apart from the driving portion 130, which is larger than that of the first area A1. Alternatively, the second area A2 has the same curvature as that of the first area A1, and may be defined as an area to which a greater external force (or stress) F due to bending of the display portion 110 (or the display panel 111) than that of the first area A1 is applied. Therefore, even when the curvature of the first area A1 and the curvature of the second area A2 are the same as each other, the pattern P may be provided in the connection portion 150 connected to the second area A2 to which the greater external force (or stress) F is applied. That is, the pattern area 151 including the pattern P may be provided in an area of the connection portion, to which the greatest external force (or stress) F due to the curvature (or bending) of the display portion 110 is applied. For example, an area of the connection portion, to which the greatest external force (or stress) F is applied, may be a partial area of the connection portion 150, which overlaps the second area A2 in FIG. 3. Therefore, as shown in FIGS. 2 and 3, at least a portion of the pattern area 151 provided with the pattern P may overlap the display portion 110. As a result, in the curved display apparatus 100 according to one embodiment of the present disclosure, the connection portion 150 may be prevented from being damaged due to the pattern area 151 including the pattern P, and the display panel 111 may be prevented from being torn, whereby light leakage may be avoided or reduced when an image is output.

As the display portion 110 (or the display panel 111) is bent, the connection portion 150 connected to the driving portion 130 may be bent or twisted as shown in FIG. 2. Since the connection portion 150 may be damaged when the twisted portion of the connection portion 150 is in contact with a corner of the cover bottom 114, a portion of the cover bottom 114, to which the driving portion 130 is coupled, may be provided to be thicker than other portions of the cover bottom 114, to which the driving portion 130 is not coupled, or may be protruded to be further spaced apart from the light guide plate LGP. Therefore, a predetermined space may be formed between the other side of the connection portion 150 connected to the driving portion 130 and the bottom surface of the cover bottom 114, whereby a twisted space of the connection portion 150 may be secured. Therefore, even though the display portion 110 (or the display panel 111) is bent so that the connection portion 150 is twisted, the connection portion 150 may not be damaged due to the corner of the cover bottom 114.

Referring back to FIGS. 2 and 3, since the connection portion 150 is bent from the upper surface of the lower substrate 111a to the bottom surface of the cover bottom 114 and thus connected to the display panel 111 and the driving portion 130, the connection portion 150 may be disposed to surround at least a portion of the guide panel 112. When the display panel 111 is bent to have a curvature, the connection portion 150 may be also bent together with the display panel 111 as shown in FIGS. 1 and 3. Therefore, the connection portion 150 may have the first curvature C1 in the first area A1 and the second curvature C2 in the second area A2. The connection portion 150 disposed in the second area A2 may be the pattern area 151 in which the pattern P is provided. As described above, since the external force (or stress) due to the bending of the display panel 111 is more greatly applied to the second area A2 than the first area A1, various patterns P may be provided in the pattern area 151 positioned in the second area A2.

Referring to FIGS. 3 and 4, a ratio of the pattern area 151 provided with the pattern P in the connection portion 150 may be 20% or less. Since the connection portion 150 needs to transfer the control signal applied from the driving portion 130 to the display panel 111 (or the pad portion), a plurality of lines (not shown) may be provided in the connection portion 150. However, since the line cannot be disposed in the pattern area 151 provided with the pattern P in the connection portion 150, the ratio of the pattern area 151 to the connection portion 150 does not exceed 20% in one embodiment. When the ratio of the pattern area 151 to the connection portion 150 exceeds 20%, some of the plurality of lines may not be disposed, whereby the control signal of the driving portion 130 may not be completely transferred to the display panel 111. Alternatively, some of the plurality of lines may be damaged when the pattern P is formed, whereby the control signal of the driving portion 130 may not be completely transferred to the display panel 111. Since the pattern P is an area from which a portion of the connection portion 150 (or the pattern area 151) is removed, the line may be damaged when the pattern P is formed and thus the line may not be disposed in the pattern area 151 in which the pattern P is provided. Therefore, in the curved display apparatus 100 according to one embodiment of the present disclosure, since the ratio occupied by the pattern area 151 in the connection portion 150 is 20% or less, an area in which a plurality of lines may be disposed may be sufficiently secured, whereby the control signal of the driving portion 130 may be completely transferred to the display panel 111.

In the curved display apparatus 100 according to one embodiment of the present disclosure, the pattern P may be a plurality of holes H or polygon PG. The shape of the pattern P may be varied depending on the curvature change amount of the pattern area 151 (or the connection portion 150). The pattern area 151 may be bent at the same curvature as that of the display portion 110 as the display portion 110 has the curvature. Therefore, the pattern area 151 may have the curvature change amount. The shape of the pattern P may be a concept including not only the shape of the pattern but also a size of the pattern P and a ratio occupied by the pattern P in the pattern area 151. Hereinafter, the pattern P will be described in detail with reference to FIGS. 5 to 8.

Figure 5:
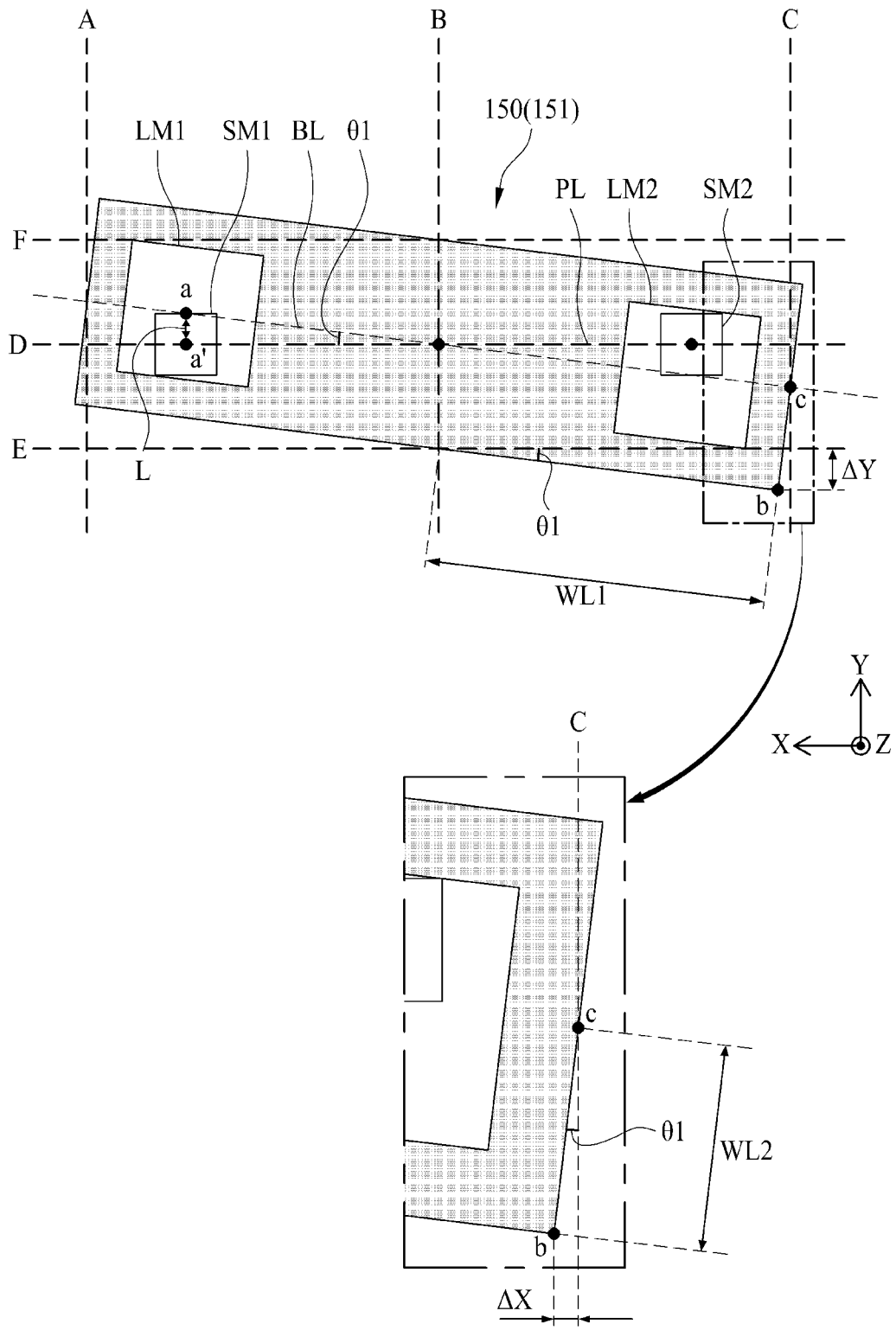
FIG. 5 is an exemplary view illustrating a curvature change amount of a pattern area according to one embodiment of the present disclosure.
Figure 6:
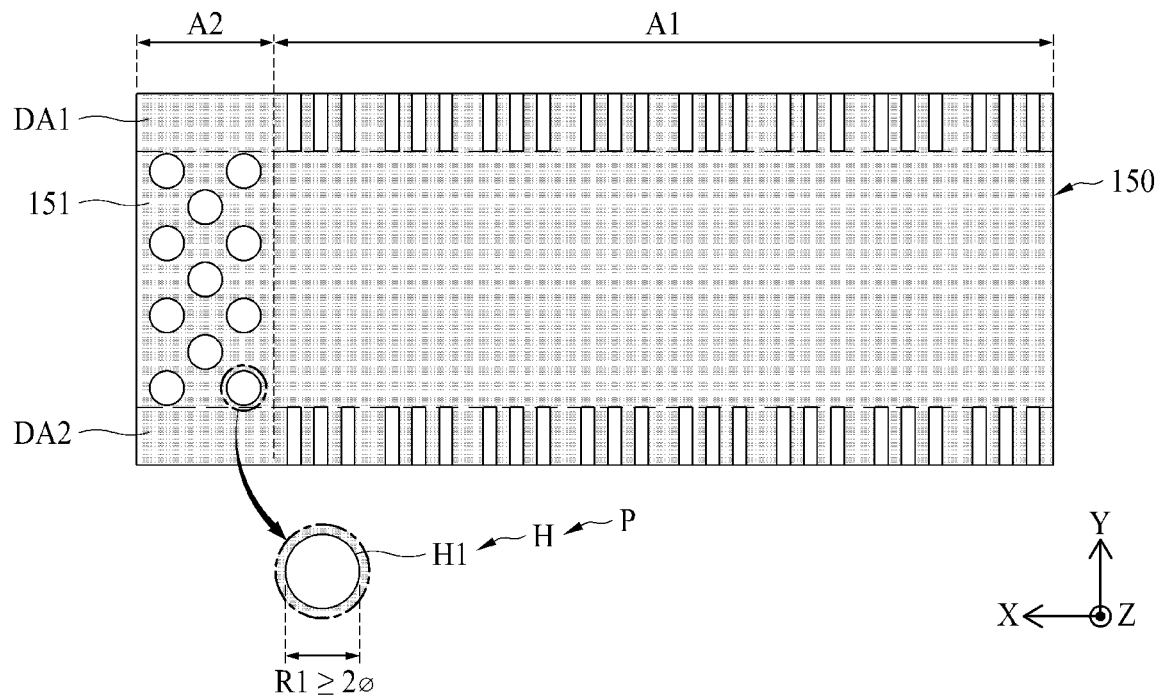
FIG. 6 is a view illustrating an example of a pattern based on a curvature change amount of a pattern area according to one embodiment of the present disclosure.
Figure 7:
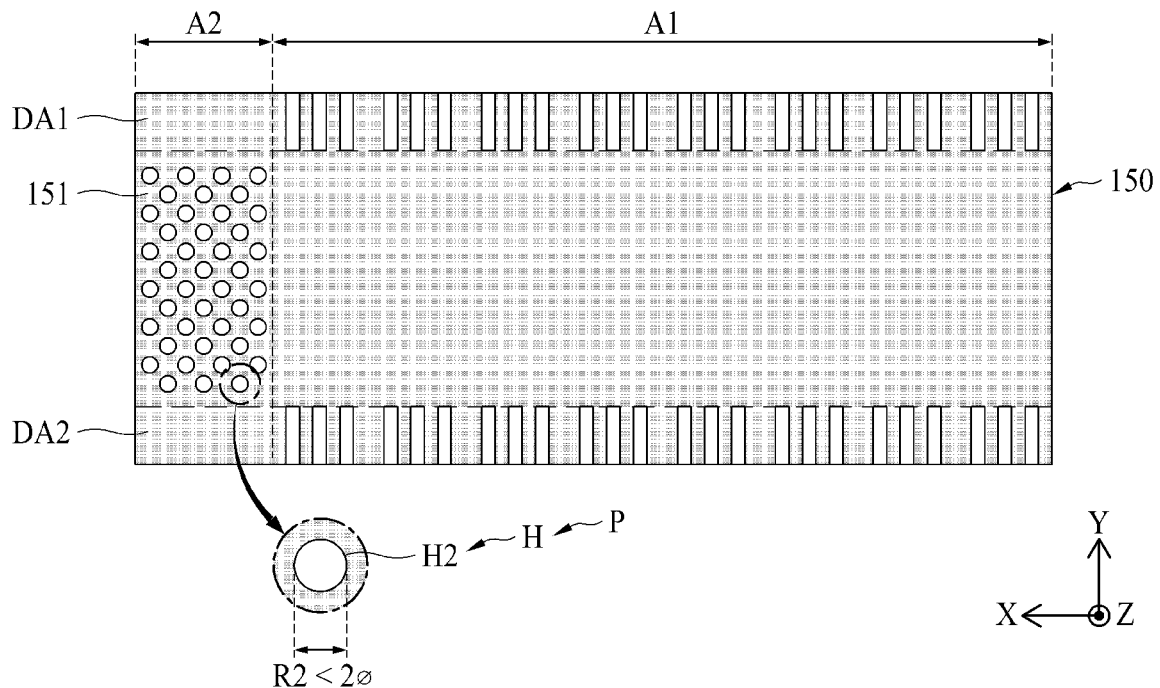
FIG. 7 is a view illustrating another example of a pattern based on a curvature change amount of a pattern area according to one embodiment of the present disclosure.
Figure 8:
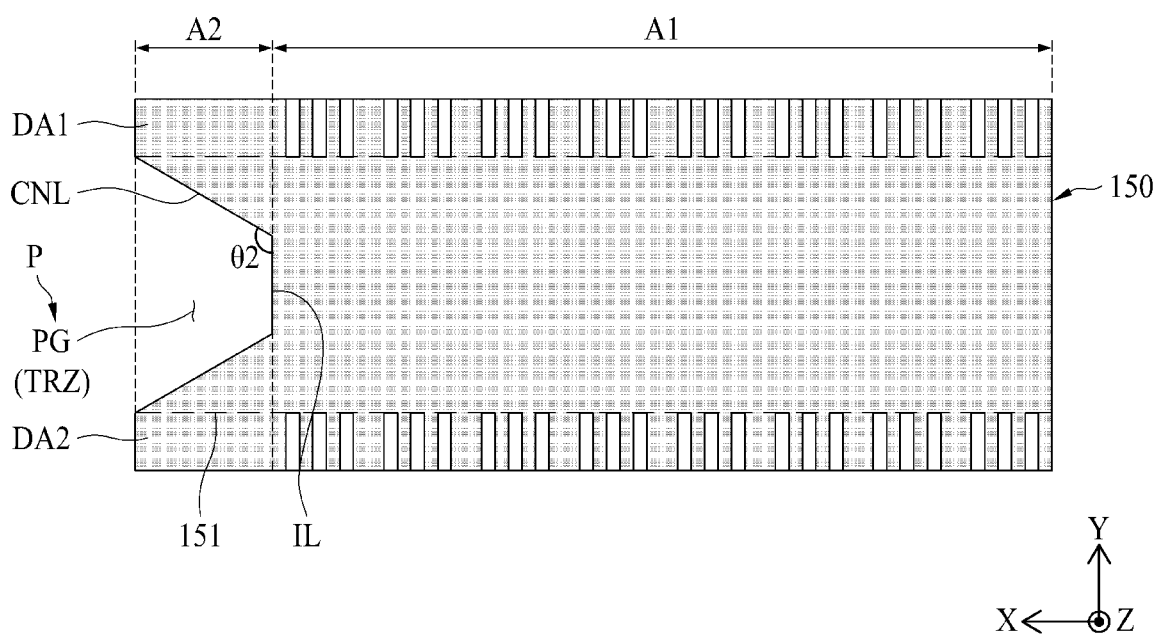
FIG. 8 is a view illustrating other example of a pattern based on a curvature change amount of a pattern area according to one embodiment of the present disclosure.

FIG. 5 is an exemplary view illustrating a curvature change amount of a pattern area according to one embodiment of the present disclosure, FIG. 6 is a view illustrating an example of a pattern based on a curvature change amount of a pattern area according to one embodiment of the present disclosure, FIG. 7 is a view illustrating another example of a pattern based on a curvature change amount of a pattern area according to one embodiment of the present disclosure, and FIG. 8 is a view illustrating other example of a pattern based on a curvature change amount of a pattern area according to one embodiment of the present disclosure.

Referring to FIGS. 5 to 8, the shape of the pattern P may be varied depending on the curvature change amount of the connection portion 150. FIG. 5 illustrates an example in which the connection portion 150 is bent with a predetermined curvature. Therefore, when the curvature of the connection portion 150 is provided as the first curvature C1 and the second curvature C2, the structure of FIG. 5 may be also applied to the pattern area 151 having the second curvature C2.

First, as shown in FIG. 5, the curvature change amount of the pattern area 151 (or the connection portion 150) may be represented by an X-axis change amount $\Delta X$ and a Y-axis change amount $\Delta Y$ when the pattern area 151 (or the connection portion 150) is bent to have a curvature, as compared with the case that the pattern area 151 (or the connection portion 150) is provided to be flat without being bent.

In this case, the X-axis change amount $\Delta X$ and the Y-axis change amount $\Delta Y$ may be derived from an angle (a first angle $\theta 1$ or a curvature angle $\theta 1$) at which a second virtual line BL connecting centers of first and second large alignment marks LM1 and LM2 is inclined when the pattern area 151 (or the connection portion 150) is bent, with respect to a first virtual line PL (side D) connecting centers of first and second small alignment marks SM1 and SM2 when the pattern area 151 (or the connection portion 150) is provided to be flat. The X-axis change amount $\Delta X$ and the Y-axis change amount $\Delta Y$ may be varied depending on the first angle $\theta 1$ (or the curvature angle $\theta 1$). The first small alignment mark SM1 and the second small alignment mark SM2 may be squares with the same size and shape. The first large alignment mark LM1 and the second large alignment mark LM2 may be squares having the same size and shape. In this case, each of the first large alignment mark LM1 and the second large alignment mark LM2 may be provided to have a side longer than a length of one side of the first small alignment mark SM1 or the second small alignment mark SM2. For example, the first large alignment mark LM1 may be a square greater than the first small alignment mark SM1.

When the pattern area 151 (or the connection portion 150) is provided to be flat without being bent, the first small alignment mark SM1 and the second small alignment mark SM2 may be positioned to be parallel with a lower side of the pattern area 151 (or the connection portion 150) and may be positioned at the center between the lower side and an upper side of the pattern area 151. That is, a center of each of the first small alignment mark SM1 and the second small alignment mark SM2 in FIG. 5 may be disposed on the side D.

In more detail, when the pattern area 151 (or the connection portion 150) is provided to be flat without being bent, the lower side of the pattern area 151 (or the connection portion 150) may coincide with a side E, and the upper side of the pattern area 151 (or the connection portion 150) may coincide with a side F. A left side of the pattern area 151 (or the connection portion 150) may coincide with a side A and a right side of the pattern area 151 (or the connection portion 150) may coincide with a side C. A vertical center side positioned at the center between the left side and the right side of the pattern area 151 (or the connection portion 150) may coincide with a side B, and a horizontal center side positioned at the center between the lower side and the upper side of the pattern area 151 (or the connection portion 150) may coincide with a side D.

A point a may be a center point of the first large alignment mark LM1, and a point a' may be a center point of the first small alignment mark SM1. L may be a distance between the points a and a'. A point b may be a vertex at which the right side and the lower side of the pattern area 151 (or the connection portion 150) meet. That is, the point b may be a point positioned at a right corner of the pattern area 151 (or the connection portion 150).

The centers of the first small alignment mark SM1 and the second small alignment mark SM2 may be positioned on the side D. Since the pattern area 151 (or the connection portion 150) is provided to be flat, the side D may be parallel with the first direction (X-axis direction).

As the pattern area 151 (or the connection portion 150) is bent to have a curvature, the side D may be inclined like a side BL. Therefore, a predetermined angle (the first angle $\theta 1$ or the curvature angle $\theta 1$) may be formed between the side D and the side BL. The center of each of the first large alignment mark LM1 and the second large alignment mark LM2 may be positioned on the side BL. The point c may be a point where the side BL and the side C meet. In this case, the X-axis change amount $\Delta X$ may be the shortest distance from the point b to the side C. The Y-axis change amount $\Delta Y$ may be the shortest distance from the point b to the side E. SDL may be a horizontal distance (or the shortest distance) from the center a to the side B of the first large alignment mark LM1. WL1 may be a length from the point, at which the side B and the side E meet, to the point b. WL2 may be a length from the point b to the point c.

Under the above condition, the X-axis change amount $\Delta X$ and the Y-axis change amount $\Delta Y$ may be derived from the first angle $\theta 1$ (or the curvature angle $\theta 1$). For example, the X-axis change amount $\Delta X$ may be derived from an equation of $\cos \theta 1 * WL2$. The Y-axis change amount $\Delta Y$ may be derived from an equation of $\sin \theta 1 * WL1$. The curvature angle $\theta 1$ may be derived from an equation of $\tan \theta 1 = L/SDL$. The X-axis change amount $\Delta X$ and the Y-axis change amount $\Delta Y$ may be respectively derived through the above equation.

For example, when the SDL is 19.3 mm, the L is 0.5 mm, the WL1 is 22 mm and the WL2 is 2.5 mm, 1.47° may be derived as the first angle $\theta 1$. In this case, the X-axis change amount $\Delta X$ may be derived as 0.06 mm and the Y-axis change amount $\Delta Y$ may be derived as 0.56 mm by the above equation. As described above, it is noted that the X-axis change amount $\Delta X$ is significantly smaller than the Y-axis change amount $\Delta Y$. Since the display portion 110 is bent in the second direction (Y-axis direction), the connection portion 150 (or the pattern area 151) may be also bent in the second direction (Y-axis direction) and thus the external force (or stress) may be more greatly applied in the second direction (Y-axis direction) than the first direction (X-axis direction). Therefore, the Y-axis change amount $\Delta Y$ may be significantly greater than the X-axis change amount $\Delta X$. As a result, the change amount due to bending of the connection portion 150 (or the pattern area 151) in the second direction (Y-axis direction), that is, the curvature change amount, may be regarded as the Y-axis change amount $\Delta Y$.

Referring to FIGS. 6 and 7, the pattern P may be formed of a plurality of holes H when the curvature change amount of the connection portion 150 (or the pattern area 151), that is, the Y-axis change amount $\Delta Y$ of the connection portion 150 (or the pattern area 151) is 1 mm or less. The plurality of holes H may be spaced apart from each other in the pattern area 151. This is to disperse the external force (or stress) F applied to the pattern area 151 in various places (or various directions) rather than one place (or one direction). The reason why the pattern P is formed of circular holes is that when the pattern P is formed of a polygon, an external force (or stress) is concentrated on a corner portion of each of the patterns so that the pattern P may be damaged. Therefore, when the curvature change amount of the connection portion 150 (or the pattern area 151) is 1 mm or less, the connection portion 150 (or the pattern area 151) may be formed of a plurality of holes H having a circular shape.

Referring back to FIG. 6, when the curvature change amount of the connection portion 150 (or the pattern area 151) is 0.5 mm or less, a diameter R1 of each of the plurality of holes H may be 2Ø or more. The plurality of holes H having a diameter of 2Ø or more may be represented as H1 depending on the curvature change amount of the connection portion 150 (or the pattern area 151) as shown in FIG. 6.

In case of the above-described condition (condition as shown in FIG. 6), a ratio of the plurality of holes H1 relative to an entire size of the pattern area 151 may be 50% or less. That is, when the curvature change amount of the connection portion 150 (or the pattern area 151) is not great, the diameter of each of the plurality of holes H1 may be provided to be 2Ø or more, and the ratio thereof may be provided to be 50% or less. As the curvature change amount of the connection portion 150 (or the pattern area 151) becomes smaller, the external force (or stress) applied to each of the plurality of holes H1 is small, so that the diameter R1 of each of the plurality of holes H1 may be increased to 2Ø or more, and the plurality of holes H1 having a large diameter may be sparsely disposed to disperse the external force (or stress). Therefore, the external force (or stress) applied to the connection portion 150 may be dispersed into the entire pattern area 151 (or the connection portion 150) by the plurality of holes H1 without being concentrated on one place. Therefore, the display panel 111 may be prevented from being torn due to the external force (or stress) F, whereby light leakage may be avoided when an image is output. Also, damage to the connection portion 150 due to the external force (or stress) F may be avoided.

In FIG. 6, the pattern area 151 may mean an area that excludes a first adhesive area DA1 and a second adhesive area DA2 from the connection portion 150 disposed in the second area A2. Referring to FIGS. 2 and 6, the first adhesive area DA1 may refer to an area in which the connection portion 150 is coupled to the lower substrate 111*a*. Areas adjacent to each other in the first direction (X-axis direction) in the first adhesive area DA1 may be areas in which lines of the connection portion 150, which are to be connected to the pad portion of the lower substrate 111*a*, are exposed. The second adhesive area DA2 may refer to an area in which the connection portion 150 is coupled to the driving portion 130. Areas adjacent to each other in the first direction (the X-axis direction) in the second adhesive area DA2 may be areas in which lines of the connection portion 150, which are to be connected to lines of the driving portion 130 and/or circuits of the driving portion 130, are exposed. Therefore, in FIG. 6, the pattern area 151 may be an area that excludes the first adhesive area DA1 and the second adhesive area DA2 from the connection portion 150 disposed in the second area A2.

FIG. 7 illustrates another example of the pattern P according to one embodiment of the present disclosure. Referring to FIG. 7, a diameter R2 of each of the plurality of holes H may be less than 2Ø when the curvature change amount of the connection portion 150 (or the pattern area 151) exceeds 0.5 mm and is 1 mm or less. As shown in FIG. 7, the plurality of holes H having a diameter less than 2Ø may be expressed as H2 in accordance with the curvature change amount of the connection portion 150 (or the pattern area 151).

In case of the above-described condition (condition as shown in FIG. 7), the ratio occupied by the plurality of holes H2 relative to the entire size of the pattern area 151 may exceed 50%. That is, when the curvature change amount of the connection portion 150 (or the pattern area 151) is greater than that of FIG. 6, the diameter of each of the plurality of holes H2 is less than 2Ø and the ratio thereof may be greater than 50%. Since an external force (or stress) applied to each of the plurality of holes H2 is increased as the curvature change amount of the connection portion 150 (or the pattern area 151) is increased, so that the diameter R2 of each of the plurality of holes H2 may be reduced to be less than 2Ø and the plurality of holes H2 having a small diameter may be more densely disposed to better disperse the external force (or stress). Therefore, the external force (or stress) applied to the connection portion 150 may be dispersed into the pattern area 151 (or the connection portion 150) by the plurality of holes H2 without being concentrated on one place. As a result, the display panel 111 may be prevented from being torn due to the external force (or stress) F, so that light leakage may be avoided when an image is output. Also, damage to the connection portion 150 due to the external force (or stress) F may be avoided.

For convenience of description, FIGS. 6 to 8 illustrate that the connection portion 150 is provided to be flat without being inclined, and thus the lower surface of the connection portion 150 may be disposed in parallel with the first direction (X-axis direction). Referring to FIGS. 6 and 7, the plurality of holes H may be disposed in a zigzag pattern in the first direction (X-axis direction) and/or the second direction (Y-axis direction) crossing the first direction (X-axis direction) inside the pattern area 151. In this case, the zigzag pattern may refer to a direction that is not parallel with a direction to which the external force (or stress) F is applied.

The reason why the plurality of holes H are disposed in a zigzag pattern is that the external force (or stress) F may be more dispersed than the case that the plurality of holes are disposed in parallel with (or in a line) with the external force (or stress) F. For example, when the plurality of holes are disposed in parallel with the stress, a plurality of holes are tightly disposed in a direction to which the external force (or stress) F is applied, so that the connection portion 150 may be more likely to be torn or damaged. Therefore, in the curved display apparatus 100 according to one embodiment of the present disclosure, the plurality of holes H provided in the pattern area 151 of the connection portion 150 may be disposed in a zigzag pattern, so that the external force (or stress) F may be more dispersed into the entire pattern area 151, whereby the connection portion 150 may be further prevented from being damaged and thus reliability may be further improved.

Meanwhile, when the pattern P is formed of a plurality of holes H, the plurality of holes H may be disposed at a position spaced apart from a side constituting the connection portion 150 (or the pattern area 151) at a predetermined distance as shown in FIG. 4. When the plurality of holes H are disposed to be adjacent to the side constituting the connection portion 150 (or the pattern area 151) or formed in the connection portion 150 (or the pattern area 151) in a shape that does not constitute a circular shape, and when an external force (or stress) is generated, the external force (or stress) may be concentrated on at least one hole H to affect another adjacent hole H so that the entire plurality of holes H may not disperse the force. Therefore, the curved display apparatus 100 according to one embodiment of the present disclosure may have a structural feature in which the plurality of holes H are disposed at a position spaced apart from the side (for example, a left side of the pattern area 151 in FIG. 6), which constitutes the connection portion 150 (or the pattern area 151), at a predetermined distance when the pattern P is formed of the plurality of holes H.

Referring to FIG. 8, the pattern P may be formed of a polygon PG when the curvature change amount of the connection portion 150 (or the pattern area 151), that is, the Y-axis change amount ΔY of the connection portion 150 (or the pattern area 151) exceeds 1 mm. This is because that the Y-axis change amount ΔY of FIG. 8 is greater than the Y-axis change amount ΔY of FIG. 6 so that the external force (or stress) F applied to the pattern area 151 in FIG. 8 may be greater than that in FIG. 6, and the pattern of the polygon PG rather than the plurality of holes H may better disperse the external force (or stress) F.

In case of the above-described condition (condition as shown in FIG. 8), the ratio occupied by the pattern of the polygon PG in the entire size of the pattern area 151 may be 80% or more. That is, when the curvature change amount of the connection portion 150 (or the pattern area 151) is great, the external force (or stress) F is greatly applied so that a ratio of the pattern of the polygonal PG in the size of the pattern area 151 may be 80% or more. Therefore, the external force (or stress) applied to the connection portion 150 may be dispersed to the entire pattern area 151 by the pattern of the polygon PG without being concentrated on one place. As a result, the display panel 111 may be prevented from being torn due to the external force (or stress) F, whereby light leakage may be avoided or reduced when an image is output. Also, damage to the connection portion 150 due to the external force (or stress) F may be avoided.

As described above, in FIG. 8, the pattern area 151 may refer to an area that excludes the first adhesive area DA1 and the second adhesive area DA2 from the connection portion 150 disposed in the second area A2. The pattern of the polygon PG may be formed in the pattern area 151 provided between the first adhesive area DA1 and the second adhesive area DA2.

The pattern of the polygon PG according to one example may be a trapezoid TRZ. As shown in FIG. 8, the trapezoid TRZ may be provided so that its width is reduced from one end of the connection portion 150 (or the pattern area 151) toward the center of the connection portion 150 (or the pattern area 151). In more detail, the trapezoid TRZ may include an inner side IL close to the center of the connection portion 150 (or the pattern area 151) and an inclined side CNL connected to both sides of the inner side IL. As shown in FIG. 8, the inner side IL and the inclined side CNL may form a second angle θ2 (or pattern angle θ2), and the second angle θ2 may be an obtuse angle greater than a right angle. As the second angle θ2 is provided at an obtuse angle, the pattern P of the trapezoid TRZ may better disperse the external force (or stress) F without being torn or damaged by the external force (or stress) F than the case that the second angle has a right angle or an acute angle. Therefore, the curved display apparatus 100 according to one embodiment of the present disclosure may have a polygon PG in the connection portion 150, for example, the pattern P of the trapezoid TRZ having a pattern angle of an obtuse angle when the Y-axis change amount ΔY of the connection portion 150 (or the pattern area 151) exceeds 1 mm, whereby the external force (or stress) may be dispersed without being concentrated on one place and thus damage to the connection portion 150 may be avoided.

In the curved display apparatus 100 according to one embodiment of the present disclosure, since the external force (or stress) may be dispersed to the entire pattern area 151 (or the entire connection portion 150) through the pattern P without being concentrated on the pattern area 151 of the connection portion 150, a force pulled in a direction opposite to a direction in which the display portion 110 (or the display panel 111) is bent may be mitigated as compared with the case that the external force is relatively concentrated on one place. Therefore, the display portion 110 (or the display panel 111) may not be torn, and thus light leakage may not occur when an image is output. The one place may refer to a virtual external force line generated at a portion where an interval between the bent display portion 110 (or the display panel 111) and the flat driving portion 130 is the longest as the display portion 110 (or the display panel 111) is bent. For example, referring to FIG. 4, one place may be a virtual external force line connecting the pattern P positioned at an outer edge (or end) in the pattern area 151 of the connection portion 150 with the driving portion 130 at the shortest distance. In this case, the outer edge (or end) may refer to an end of the pattern area 151 in a direction from the first area A1 to the second area A2. The outer edge (or end) may be a left side of the connection portion 150 based on FIG. 4.

Meanwhile, when the pattern P is formed of the polygon PG, the polygon PG may be disposed to be communicated with the outside as shown in FIG. 8. Since the Y-axis change amount ΔY of the connection portion 150 (or the pattern area 151) exceeds 1 mm, the external force (or stress) applied to the connection portion 150 (or the pattern area 151) is great, so that the pattern area 151 (or the connection portion 150) adjacent to the pattern PG is partially deformed to mitigate the external force (or stress). For example, when the Y-axis change amount ΔY of the connection portion 150 (or the pattern area 151) exceeds 1 mm in FIG. 8, the pattern area 151 positioned at the upper side and adjacent to the pattern PG may be deformed to be bent upward and the pattern area 151 positioned at the lower side may be deformed to be bent downward, whereby the external force (or stress) may be mitigated. In this case, the second angle θ2 (or the pattern angle θ2) may be greater than that before the pattern area 151 is deformed, and a width between the inclined sides CNL may be further increased. As a result, when the pattern P is formed of the polygon PG, the curved display apparatus 100 according to one embodiment of the present disclosure may have a structural feature in which the pattern P is formed in the connection portion 150 (or the pattern area 151) to have a shape communicated with the outside, that is, a shape in which one side of the polygon is opened.

In the curved display apparatus 100 according to one embodiment of the present disclosure, the pattern P having various shapes and various ratios may be provided in the connection portion 150 (or the pattern area 151) to reduce or disperse the external force (or stress) generated due to bending (or curvature) of the display portion 110 (or the display panel 111). Therefore, the curved display apparatus 100 according to one embodiment of the present disclosure may improve versatility with respect to a curved display panel having various curvatures.

Meanwhile, the connection portion 150 may be connected to the display panel 111 and the driving portion 130 while surrounding a portion of each of the display panel 111 and the cover bottom 114, for example, a portion of the upper surface of the lower substrate 111a and a portion of the lower surface of the cover bottom 114 and the protruded guide panel 112a (or the vertical portion 112a). Therefore, as shown in FIG. 2, at least a portion of the pattern P provided in the connection portion 150 (or the pattern area 151) may overlap the guide panel 112a (or the vertical portion 112a of the guide panel 112) protruded from the side of the display panel 111. For example, the pattern P may overlap at least a portion of a right side, an upper surface or a lower surface of the vertical portion 112a based on FIG. 2. When the pattern P is formed of the polygon PG, most of the pattern of the polygonal PG may overlap the right side of the vertical portion 112a that is provided to be flat while being relatively less bent.

Hereinafter, the case that the connection portion 150 provided with the pattern P reduces the external force (or stress) generated due to bending of the display portion 110 (or the display panel 111) will be described with reference to FIGS. 9A to 11B.

Figure 9A:
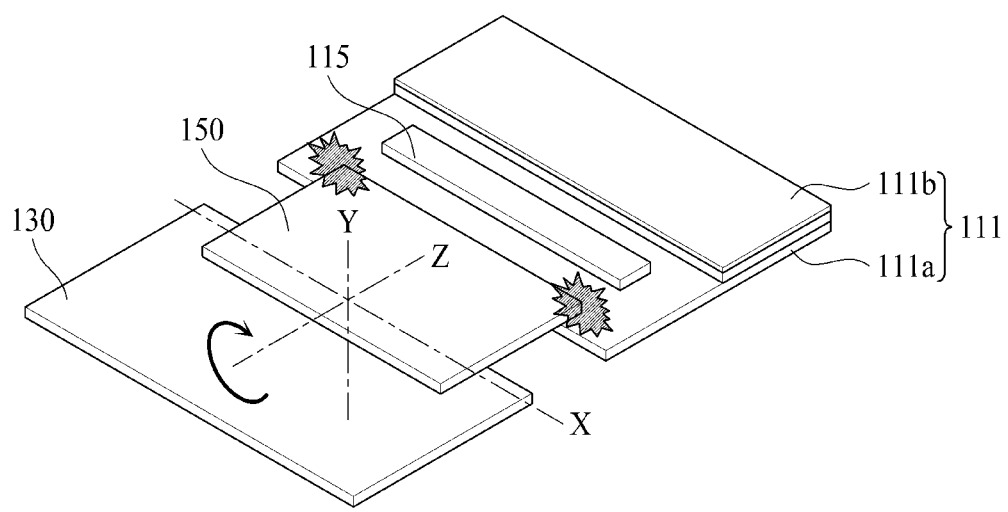
FIG. 9A is a view illustrating a comparative example in which a general connection portion having no pattern is rotated as much as 2° based on Z-axis.
Figure 9B:
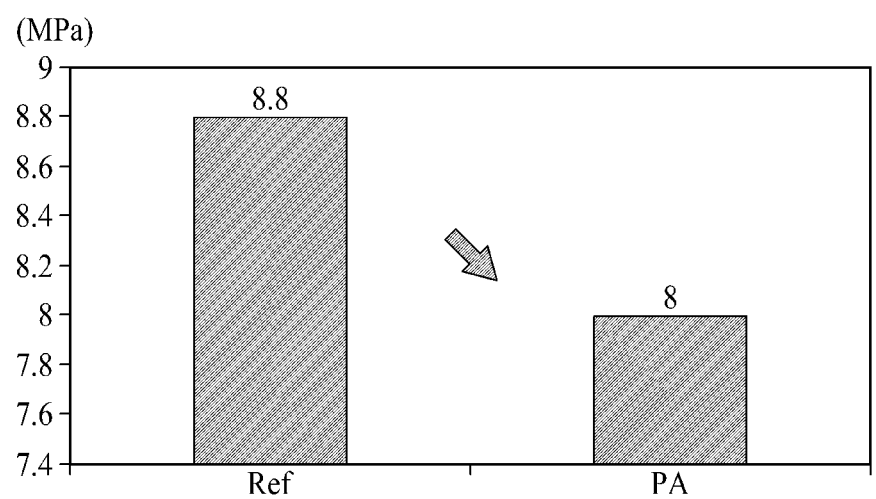
FIG. 9B is a graph illustrating that stress transferred to a display panel in a general connection portion and stress transferred to a display panel in a connection portion of the present disclosure are compared with each other under the condition of FIG. 9A.
Figure 10A:
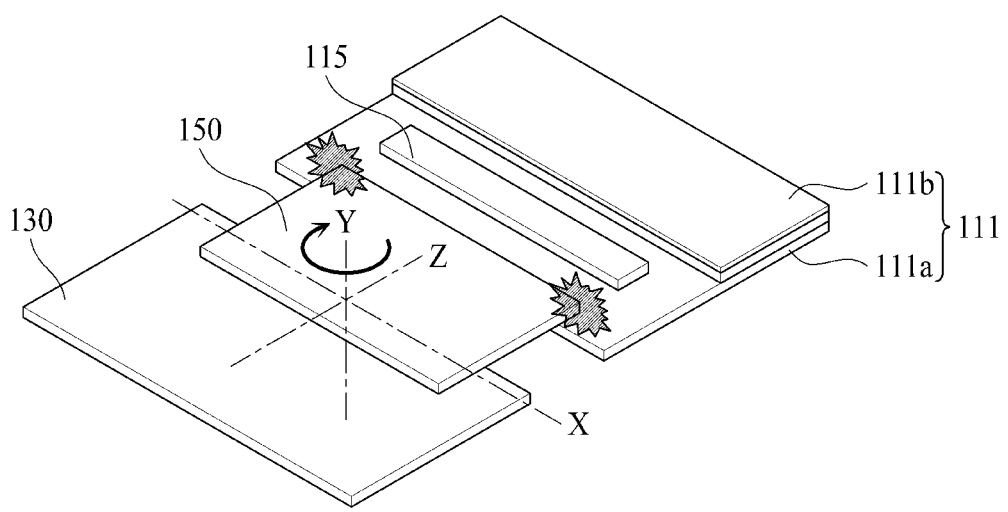
FIG. 10A is a view illustrating a comparative example in which a general connection portion having no pattern is rotated as much as 0.001° based on Y-axis.
Figure 10B:
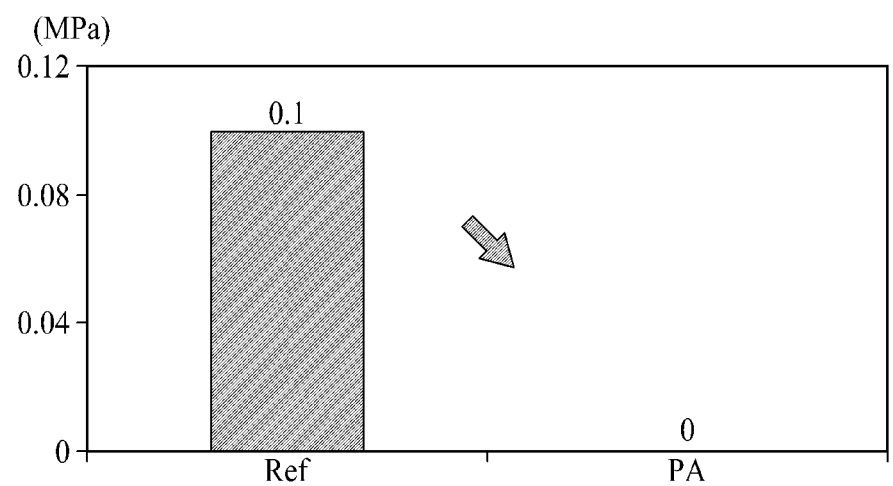
FIG. 10B is a graph illustrating that stress transferred to a display panel in a general connection portion and stress transferred to a display panel in a connection portion of the present disclosure are compared with each other under the condition of FIG. 10A.
Figure 11A:
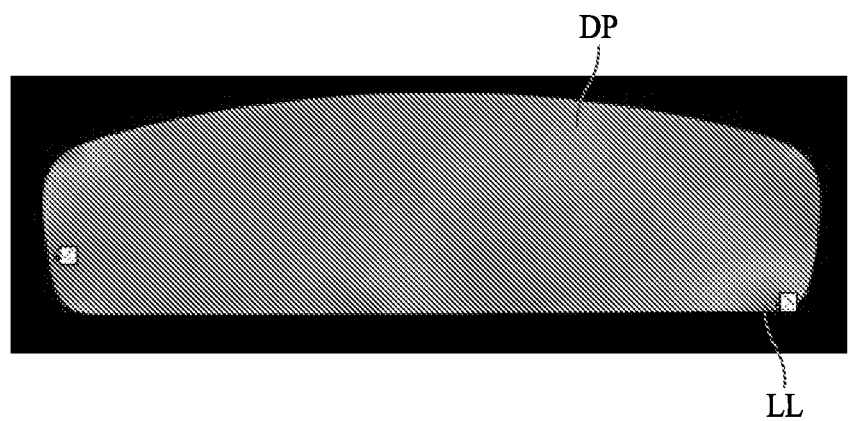
FIG. 11A is a view illustrating black uniformity of a curved display apparatus when a general connection portion having no pattern has a curvature.
Figure 11B:
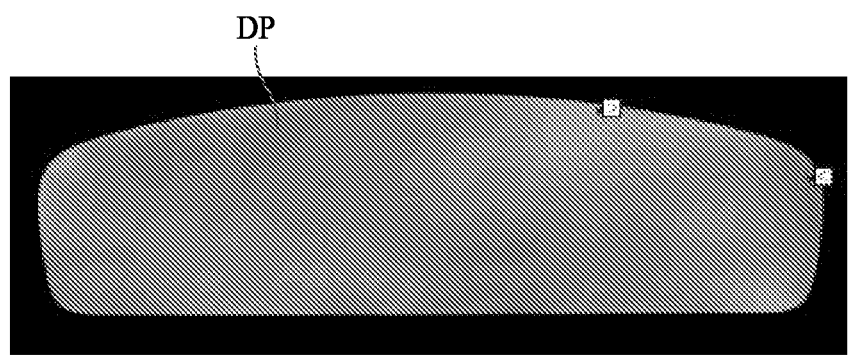
FIG. 11B is a view illustrating black uniformity of a curved display apparatus according to one embodiment of the present disclosure.

FIG. 9A is a view illustrating a comparative example in which a general connection portion having no pattern is rotated as much as 2° based on Z-axis, FIG. 9B is a graph illustrating that stress transferred to a display panel in a general connection portion and stress transferred to a display panel in a connection portion of the present disclosure are compared with each other under the condition of FIG. 9A, FIG. 10A is a view illustrating a comparative example in which a general connection portion having no pattern is rotated as much as 0.001° based on Y-axis, FIG. 10B is a graph illustrating that stress transferred to a display panel in a general connection portion and stress transferred to a display panel in a connection portion of the present disclosure are compared with each other under the condition of FIG. 10A, FIG. 11A is a view illustrating black uniformity of a curved display apparatus when a general connection portion having no pattern has a curvature, and FIG. 11B is a view illustrating black uniformity of a curved display apparatus according to one embodiment of the present disclosure.

FIGS. 9A and 10A are views illustrating that a general connection portion having no pattern is rotated based on Y-axis or Z-axis. For convenience of description, FIGS. 9A and 10A illustrate that a display panel, a driving portion and a connection portion are disposed in a line in Z-axis direction. FIGS. 9B and 10B are graphs illustrating that external forces (or stresses) transferred to the display panel 111 (or the lower substrate 111a) are compared with each other in the general connection portion 150 having no pattern and the connection portion 150 of the present disclosure in accordance with the condition of each of FIGS. 9A and 10A.

First, as shown in FIG. 9A, when the general connection having no pattern is rotated as much as 2° based on the Z-axis, the external force (or stress) may be the greatest at both sides of the general connection portion. This is because twist may be the greatest at a position farthest from a rotational axis. In this case, as shown in FIG. 9B, in case of the general connection portion (Ref), an external force (or stress) of about 8.8 MPa is transferred from the connection portion to the display panel. On the other hand, in case of the connection portion 150 provided with the pattern P of the present disclosure (PA), an external force (or stress) of about 8 MPa is transferred from the connection portion 150 to the display panel 111. This may mean that the external force (or stress) transferred to the display panel 111 is reduced as much as about 9% in accordance with the rotation of the connection portion 150. Therefore, when the connection portion is rotated as much as 2° based on the Z-axis, the external force (or stress) applied to the display panel 111 is smaller in the case that the connection portion 150 is provided with the pattern P than the general case that the connection portion has no pattern, so that the display panel 111 may be prevented from being torn, whereby light leakage may not occur when an image is output.

Next, as shown in FIG. 10A, when the general connection portion having no pattern is rotated as much as 0.001° based on the Y-axis, the external force (or stress) may be the greatest at both sides of the general connection portion. This is because twist may be the greatest at a position farthest from a rotational axis. In this case, as shown in FIG. 10B, in case of the general connection portion (Ref), an external force (or stress) of about 0.1 MPa is transferred from the connection portion to the display panel. On the other hand, in case of the connection portion 150 provided with the pattern P of the present disclosure (PA), an external force (or stress) of 0 MPa, that is, no external force (or stress) is transferred from the connection portion 150 to the display panel 111. This may mean that the external force (or stress) transferred to the display panel 111 is reduced as much as 100% in accordance with the rotation of the connection portion 150. Therefore, when the connection portion is rotated as much as 0.001° based on the Y-axis, the external force (or stress) is not transferred to the display panel 111 in the case that the connection portion 150 is provided with the pattern P like the present disclosure, so that the display panel 111 may be prevented from being torn, whereby light leakage may not occur when an image is output.

When the display panel and the driving portion are connected to each other through the general connection portion having no pattern and bending occurs in the display panel, the general connection portion may be also bent (or rotated) to have a curvature. In this case, as described above, the external force (or stress) may be transferred to the display panel, and light leakage may occur as shown in FIG. 11A. The light leakage LL may be identified by measurement of black uniformity. As shown in FIG. 11A, the light leakage LL may occur in the form of a red spot in measurement of black uniformity. In case of FIG. 11A, black uniformity may have a low value of about 56.6%.

On the other hand, when the display panel 111 and the driving portion 130 are connected to each other through the connection portion 150 provided with the pattern P and the display panel 111 is bent like the curved display apparatus 100 according to one embodiment of the present disclosure, light leakage may not occur in the display portion DP as shown in FIG. 11B. Therefore, in case of FIG. 11B, black uniformity may have a high value of about 73.95%, and as a result, it is noted that black uniformity of the display portion DP of the present disclosure is improved as much as about 30% as compared with black uniformity of the display portion DP provided with the general connection portion having no pattern.

Meanwhile, the curved display apparatus 100 according to one embodiment of the present disclosure has a tensile force according to the external force of each of the general connection portions having no pattern and the connection portion 150 provided with the pattern P. As a result, the general connection portion having no pattern represented a tensile force of about 7.0N and the connection portion 150 provided with the pattern P of the present disclosure represented a tensile force of about 15.4N, whereby it is noted that a tensile force of the connection portion 150 provided with the pattern P was further improved about 120% as compared with that of the general connection portion having no pattern. This may mean that the connection portion 150 provided with the pattern P may better disperse the external force (or stress) than the general connection portion having no pattern, whereby damage to the connection portion 150 and/or damage to the display panel 111 may be avoided.

As a result, in the curved display apparatus 100 according to one embodiment of the present disclosure, the driving portion 130 and the display panel 111 are connected to each other through the connection portion 150 provided with the pattern P, so that the external force (or stress) generated due to bending of the display panel 111 may be dispersed through the pattern P to prevent the display panel 111 from being torn, whereby light leakage may be avoided.

Figure 12A:
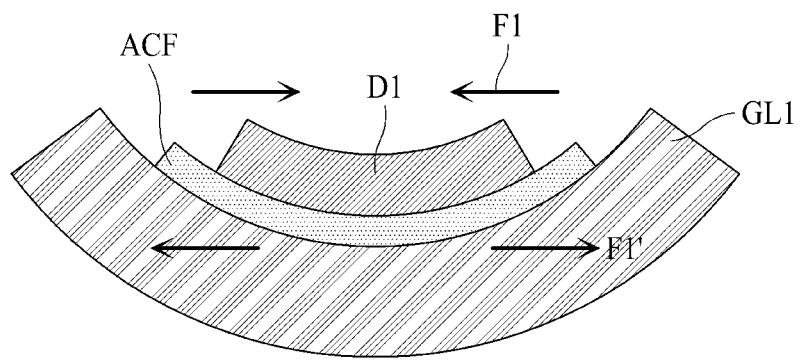
FIG. 12A is a view illustrating stress applied to a display panel when a drive integrated circuit (IC) is provided.
Figure 12B:
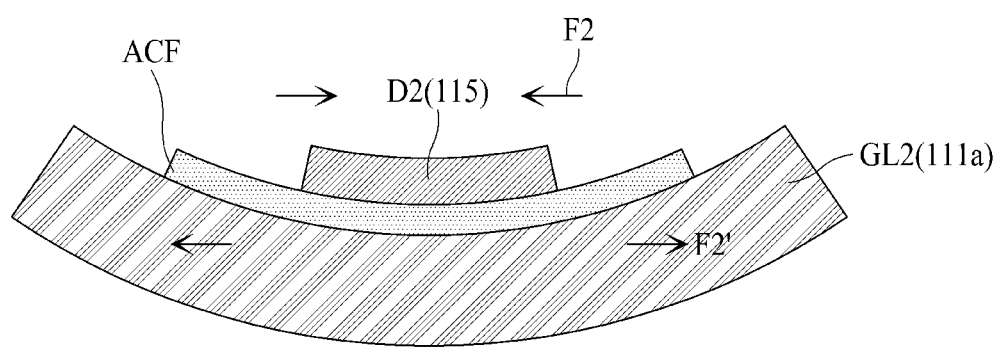
FIG. 12B is a view illustrating stress applied to a display panel in a curved display apparatus according to one embodiment of the present disclosure.

FIG. 12A is a view illustrating stress applied to a display panel when one drive IC is provided, and FIG. 12B is a view illustrating stress applied to a display panel in a curved display apparatus according to one embodiment of the present disclosure.

The curved display apparatus 100 according to one embodiment of the present disclosure may include at least two drive ICs 115 between the adhesive member SL and the connection portion 150.

When one drive IC is provided, the size of the drive IC D1 may be increased as shown in FIG. 12A to transfer various image signals to the display panel. The drive IC may be attached to the display panel (or the lower substrate) through an adhesive ACF and then pressed by high heat and high pressure above the drive IC and attached to the display panel (or the lower substrate). However, when the size of the drive IC D1 is large, since contraction stress F1 of the drive IC is increased during cooling, expansion stress F1' may be increased toward an edge of a lower substrate GL1, whereby the lower substrate GL1 may be greatly bent. That is, the lower substrate GL1 may be bent to have a small curvature. In this case, the lower substrate GL1 may be torn from the upper substrate (not shown), whereby light leakage may occur when an image is output.

In contrast, when at least two drive ICs 115 are provided like the curved display apparatus 100 according to one embodiment of the present disclosure, since the image signal may be divided and transferred to the display panel through two or more drive ICs, a size of a drive IC D2 may be reduced. In this case, as shown in FIG. 12B, since contraction stress F2 of the drive IC is small during cooling of the drive IC D2, expansion stress F2' is reduced toward an edge of a lower substrate GL2 (111a), whereby the lower substrate GL2 may not be greatly bent. That is, the lower substrate GL2 (111a) may be bent to have a curvature greater than that of FIG. 12A. Therefore, in case of FIG. 12B, the lower substrate GL2 may not be torn against the upper substrate (not shown), whereby light leakage may not occur when an image is output.

As a result, at least two drive ICs 115 are provided in the curved display apparatus 100 according to one embodiment of the present disclosure, so that the size of each of the drive IC 115 may be reduced, whereby the display panel 111 may be further prevented from being damaged (or torn) and thus light leakage may not occur when an image is output.

According to the present disclosure, the following advantageous effects may be obtained.

In the present disclosure, since the pattern area having a predetermined pattern is provided in the connection portion connecting the display portion with the driving portion, even though the display panel is bent to have a curvature, the external force (or stress) generated due to bending may be dispersed to prevent the display panel from being damaged.

Also, in the present disclosure, since the size and ratio of the pattern are varied depending on the curvature of the display portion, versatility for the curved display panel having various curvatures may be improved.

It will be apparent to those skilled in the art that the present disclosure described above is not limited by the above-described embodiments and the accompanying drawings and that various substitutions, modifications and change amounts can be made in the present disclosure without departing from the spirit or scope of the disclosures. Consequently, the scope of the present disclosure is defined by the accompanying claims and it is intended that all change amounts or modifications derived from the meaning, scope and equivalent concept of the claims fall within the scope of the present disclosure.

What is claimed is:

1. A curved display apparatus comprising:
   a display portion having a first curvature and a second curvature that is larger than the first curvature;
   a driving portion configured to drive the display portion; and
   a connection portion connecting the driving portion with the display portion,
   wherein the connection portion includes a pattern area between the display portion having the second curvature and the driving portion, the pattern area having a pattern,
   wherein the driving portion is provided flat, and
   wherein the pattern overlaps the display portion and the driving portion in a thickness direction of the display portion.

2. The curved display apparatus of claim 1, wherein a ratio of the pattern area in the connection portion is 20% or less.

3. The curved display apparatus of claim 1, wherein the pattern is a plurality of holes or a polygon.

4. The curved display apparatus of claim 3, wherein the plurality of holes are inside the pattern area in a zigzag pattern in a first direction and/or a second direction that crosses the first direction.

5. The curved display apparatus of claim 3, wherein the pattern area has the second curvature and includes a curvature change amount based on the second curvature, and the pattern includes the plurality of holes when the curvature change amount is 1 mm or less, and the pattern includes the polygon when the curvature change amount exceeds 1 mm.

6. The curved display apparatus of claim 5, wherein a diameter of each of the plurality of holes is 2Ø or more when the curvature change amount is 0.5 mm or less, and a ratio occupied by the plurality of holes having the diameter of 2Ø or more in the pattern area is 50% or less.

7. The curved display apparatus of claim 5, wherein a diameter of each of the plurality of holes is less than 2Ø when the curvature change amount exceeds 0.5 mm and is 1 mm or less, and a ratio occupied by the plurality of holes having the diameter less than 2Ø in the pattern area exceeds 50%.

8. The curved display apparatus of claim 3, wherein a ratio occupied by the pattern of the polygon in the pattern area is 80% or more.

9. The curved display apparatus of claim 3, wherein the polygon is a trapezoid, and the trapezoid has a width that is gradually reduced from an end of the connection portion toward a center of the connection portion.

10. The curved display apparatus of claim 3, wherein the polygon is a trapezoid that includes an inner side towards a center of the connection portion and an inclined side connected to the inner side, and an angle formed between the inner side and the inclined side is an obtuse angle.

11. The curved display apparatus of claim 1, wherein the display portion includes a display panel configured to output an image and a guide panel supporting the display panel, the guide panel partially protruding from a side of the display panel, and
   at least a portion of the pattern overlaps the protruded guide panel.

12. The curved display apparatus of claim 11, wherein the display portion further includes a shock buffer between the display panel and the guide panel.

13. The curved display apparatus of claim 11, wherein the display portion further includes a cover bottom on a rear surface of the display panel, the cover bottom supporting the guide panel,
   wherein the driving portion is on a rear surface of the cover bottom, and the connection portion is connected to the display panel and the driving portion and surrounds a portion of each of the display panel, the cover bottom, and the protruded guide panel.

14. The curved display apparatus of claim 11, wherein the display portion includes at least two drive integrated circuits coupled to the display panel to adjoin the connection portion.

* * * * *